United States Patent
Nocon (10) Patent No.: US 10,444,840 B2
(45) Date of Patent: Oct. 15, 2019

(54) SYSTEMS AND METHODS TO SYNCHRONIZE VISUAL EFFECTS AND HAPTIC FEEDBACK FOR INTERACTIVE EXPERIENCES

(71) Applicant: Disney Enterprises, Inc., Burbank, CA (US)

(72) Inventor: Nathan Nocon, Valencia, CA (US)

(73) Assignee: Disney Enterprises, Inc., Burbank, CA (US)

( * ) Notice: Subject to any disclaimer, the term of this patent is extended or adjusted under 35 U.S.C. 154(b) by 154 days.

(21) Appl. No.: 15/691,307

(22) Filed: Aug. 30, 2017

(65) Prior Publication Data

US 2019/0064924 A1 Feb. 28, 2019

(51) Int. Cl.
G06F 3/01 (2006.01)
G06F 3/147 (2006.01)
G02B 27/01 (2006.01)

(52) U.S. Cl.
CPC ............ G06F 3/016 (2013.01); G06F 3/147 (2013.01); G02B 27/017 (2013.01); G09G 2370/10 (2013.01); G09G 2370/16 (2013.01)

(58) Field of Classification Search
CPC ........ G02B 27/017; G06F 3/016; G06F 3/147
See application file for complete search history.

(56) References Cited

U.S. PATENT DOCUMENTS

| | | | |
|---|---|---|---|
| 6,411,276 B1 | 6/2002 | Braun | |
| 7,746,320 B2 | 6/2010 | Hardwick | |
| 7,812,815 B2 | 10/2010 | Banerjee | |
| 8,035,629 B2 | 10/2011 | Daniel | |
| 8,243,099 B2 | 8/2012 | Ryu | |
| 9,132,342 B2 | 9/2015 | Balachandreswaran | |
| 9,526,658 B2 | 12/2016 | Dialameh | |
| 9,563,266 B2 | 2/2017 | Banerjee | |
| 2009/0201247 A1 | 8/2009 | Aviles | |

(Continued)

FOREIGN PATENT DOCUMENTS

WO WO2016168117 10/2016

OTHER PUBLICATIONS

Bianchi, et al., High Precision Augmented Reality Haptics, Computer Vision Laborator; ETH Zurich Switzerland; Retrieved on May 3, 2017 from https://www.vision.ee.ethz.ch/publications/papers/proceedings/eth_biwi_00455.pdf.

*Primary Examiner* — Viet D Pham
(74) *Attorney, Agent, or Firm* — Esplin & Associates, PC (57) ABSTRACT

This disclosure presents systems and methods to synchronize visual effects and haptic feedback for interactive experiences. Visual circuit control signals may dictate control of a presentation device to present images forming virtual content. Haptic circuit control signals may dictate control of a haptic feedback device to provide haptic output. Timing information conveying one or both of latency in the execution of the visual circuit control signals by the presentation device and/or latency in the execution of the haptic circuit control signals by the haptic feedback device may be determined. Based on the timing information, transmission of the visual circuit control signals to the presentation device and/or transmission of the haptic circuit control signals to the haptic feedback device may be effectuated so that the presentation of images and provision of haptic output occur within a threshold time span.

12 Claims, 3 Drawing Sheets

(56) References Cited

U.S. PATENT DOCUMENTS

| | | |
|---|---|---|
| 2009/0253109 A1 | 10/2009 | Anvari |
| 2016/0026253 A1 | 1/2016 | Bradski |
| 2016/0070348 A1* | 3/2016 | Cowley ................... G06F 3/016 345/156 |
| 2016/0235323 A1* | 8/2016 | Tadi ..................... A61B 5/7285 |
| 2016/0320842 A1 | 11/2016 | Saboune |
| 2017/0300115 A1* | 10/2017 | Kerr ........................ G06F 3/016 |
| 2018/0081439 A1* | 3/2018 | Daniels ................... G06F 1/163 |
| 2018/0239430 A1* | 8/2018 | Tadi ................... G02B 27/0172 |

\* cited by examiner

SYSTEMS AND METHODS TO SYNCHRONIZE VISUAL EFFECTS AND HAPTIC FEEDBACK FOR INTERACTIVE EXPERIENCES

FIELD

This disclosure relates to systems and methods to synchronize visual effects and haptic feedback for interactive experiences.

BACKGROUND

When implementing augmented reality (AR) and/or virtual reality (VR) systems, accurate visual presentation and haptic feedback make the experiences more realistic.

SUMMARY

One aspect of the disclosure relates to a system configured to synchronize visual effects and haptic feedback for interactive experiences, in accordance with one or more implementations. Interactive experiences may take place in an interactive space. An interactive space may include one or both of an augmented reality (AR) environment, a virtual reality (VR) environment, and/or other interactive spaces. An augmented reality environment may include views of images forming virtual content superimposed over views of the real world. A virtual reality environment may include views of images forming virtual content within a virtual environment. The terms "space" and "environment" in the context of virtual reality and/or augmented reality may be used interchangeably herein. Virtual content may include one or more of virtual objects, virtual worlds, and/or other virtual content.

The system may include one or more of one or more computing platforms, one or more presentation platforms, one or more input devices, one or more haptic feedback devices, and/or other components. The one or more computing platforms may be configured by machine-readable instructions. The machine-readable instructions may include one or more computing program components. The computer program components may include one or more of a visual control component, a haptic control component, a latency component, a synchronization component, and/or other components.

The visual control component may be configured to obtain visual circuit control signals. The visual circuit control signals may dictate control of a presentation device to present images forming virtual content. The presentation device may be arranged on a headset such that when the headset is installed on a user's head, the user's gaze may be directed towards the presentation device to view the images. The execution of the visual circuit control signals by the presentation device may cause the presentation device to present the images at a first point in time.

The haptic control component may be configured to obtain haptic circuit control signals. The haptic circuit control signals may dictate control of a haptic feedback device to provide haptic output. The execution of the haptic circuit control signals by the haptic feedback device may cause the haptic feedback device to provide the haptic output at a second point in time.

The latency component may be configured to determine timing information. The timing information may convey one or both of latency in the execution of the visual circuit control signals by the presentation device and/or latency in the execution of the haptic circuit control signals by the haptic feedback device.

The synchronization component may be configured to, based on the timing information, effectuate transmission of the visual circuit control signals to the presentation device and/or the haptic circuit control signals to the haptic feedback device. The transmission(s) may be configured so that the first point in time and the second point in time may occur within a threshold time span.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
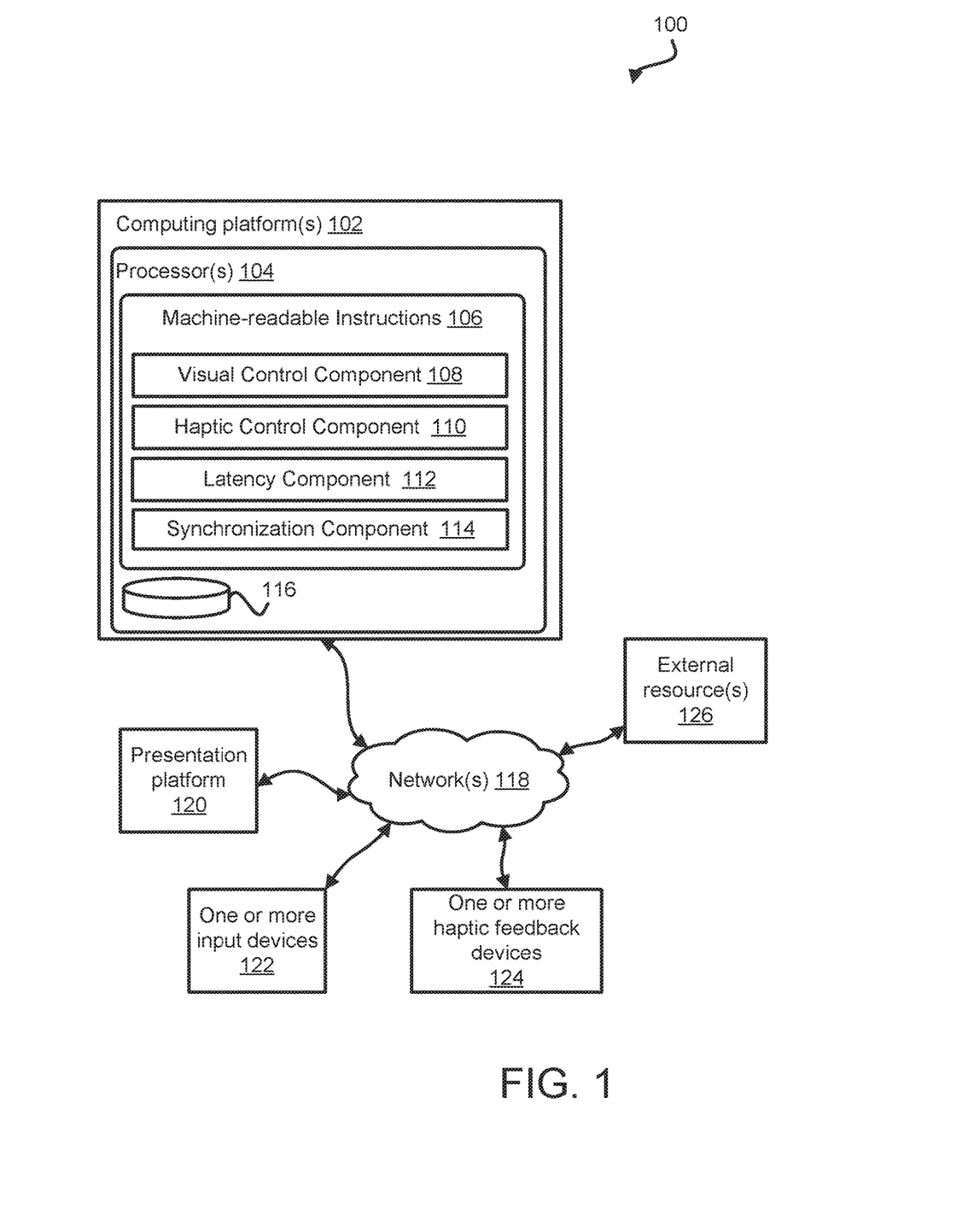
FIG. 1 illustrates a system configured to synchronize visual effects and haptic feedback for interactive experiences, in accordance with one or more implementations.

FIG. 1 illustrates a system 100 configured to synchronize visual effects and haptic feedback for interactive experiences, in accordance with one or more implementations. Interactive experiences may take place in an interactive space. An interactive space may include one or both of an augmented reality (AR) environment, a virtual reality (VR) environment, and/or other interactive spaces. An augmented reality environment may include views of images forming virtual content superimposed over views of the real world. A virtual reality environment may include views of images forming virtual content within a virtual environment. The terms "space" and "environment" in the context of virtual reality and/or augmented reality may be used interchangeably herein. Virtual content may include one or more of virtual objects, virtual worlds, and/or other virtual content.

An interactive experience within an interactive space may include haptic feedback synchronized with visual effects to make the experiences more realistic. Current haptic feedback implementations may have an inherent delay which, when applied in an interactive space, may be noticeable and/or may degrade the experience. To address this requires precise synchronization to tell the system when to trigger the haptic feedback. Using an understanding of latencies (e.g., delays), system 100 may be configured to precisely align visual effects to haptic feedback. The latencies considered may include one or more of motion to photon latencies, network timings, component start up times, latencies that might change (e.g., wireless BLE connection interval), and/ or other considerations. In some implementations, latencies may be grouped into one or more of a "visual circuit latency" (e.g., related to the generation of visual effects), "haptic circuit latency" (e.g., related to the generation of haptic feedback), and/or other system latencies.

The system 100 may include one or more of one or more computing platforms 102, a presentation platform 120, one or more input devices 122, one or more haptic feedback devices 124, one or more external resources 126, and/or other components. The one or more computing platforms 102 may include one or more of one or more physical processors 104, non-transitory electronic storage 116, and/or other components. The non-transitory electronic storage 116 may be configured to store information utilized by one or more computing platforms 102, presentation platform 120, one or more input devices 122, one or more haptic feedback devices 124, and/or other components of system 100.

The one or more computing platforms 102, presentation platform 120, one or more input devices 122, one or more haptic feedback devices 124, and/or other components of system 100 may be operatively linked via one or more electronic communication links. For example, such electronic communication links may be established, at least in part, via one or more networks 118. The one or more networks 118 may include wired and/or wireless connections. By way of non-limiting illustration, network(s) 118 may include one or more of the Internet, wireless Bluetooth Low Energy (BLE), wired Universal Serial Bus (USB) connection, and/or other connections. It will be appreciated that this is not intended to be limiting and that the scope of this disclosure includes implementations in which components of system 100 may be operatively linked via some other communication media.

In some implementations, one or more computing platforms 102 may be configured to provide remote hosting of features and/or functions of machine-readable instructions 106 to one or more of presentation platform 120, one or more input devices 122, one or more haptic feedback devices 124, and/or other components. In some implementations, one or more computing platforms 102 may be remotely located from one or more of presentation platform 120, one or more input devices 122, one or more haptic feedback devices 124, and/or other components. The one or more computing platforms 102 may communicate with one or more of presentation platform 120, one or more input devices 122, one or more haptic feedback devices 124, and/or other components via client/server architecture, and/or other communication schemes. By way of non-limiting illustration, one or more computing platforms 102 may comprise one or more servers and/or other computing devices.

In some implementations, one or more computing platforms 102 may be configured to provide local hosting of features and/or functions of machine-readable instructions 106 to one or more of presentation platform 120, one or more input devices 122, one or more haptic feedback devices 124, and/or other components. In some implementations, one or more computing platforms 102 may be included with and/or coupled to one or more of presentation platform 120, one or more input devices 122, one or more haptic feedback devices 124, and/or other components. The one or more computing platforms 102 may communicate with one or more of presentation platform 120, one or more input devices 122, one or more haptic feedback devices 124, and/or other components via local wired and/or wireless connections (e.g., USB, BLE and/or other connections), and/or other communication schemes. By way of non-limiting illustration, one or more computing platforms 102 may include one or more of a mobile computing platform (e.g., one or more of a cellular telephone, a smartphone, a laptop, a tablet computer, an AR/VR platform, and/or other computing platforms), a stationary computing platform (e.g., a desktop computer, gaming console, and/or other computing platforms), and/or other computing platforms.

The depictions in the figures are illustrative and not intended to be limited. For example, in some implementations, one or more computing platforms 102 and presentation platform 120 may be in direct wired communication and reside inside dedicated hardware (e.g., a smartphone, a head mounted display, and/or other hardware). The dedicated hardware may be separate from one or more input devices 122 and/or one or more haptic feedback devices 124. The one or more input devices 122 and/or the one or more haptic feedback devices 124 may communicate with each other and/or the dedicated hardware wirelessly via BLE. In some implementations, one or more input devices 122 and one or more haptic feedback devices 124 may be combined into one peripheral device. In some implementations, one or more haptic feedback devices 124 may be standalone wearable devices.

In some implementations, presentation device 120 include one or more of a display, one or more sensors, and/or other components. A display may be configured to present virtual content. Virtual content may be in the form of images, video, text, and/or other content. Presentation of images, video, text, and/or other content via a display of presentation device 120 may be facilitated by control signals communicated to presentation device 120 (see, e.g., visual control component 108). A display may include one or more of screen, a set of screens, a touchscreen, a monitor, a headset (e.g., a head-mounted display, glasses, goggles), and/or other displays. In some implementations, presentation device 120 may be configured to present content individually to each eye of a user as stereoscopic pairs. In some implementations, presentation device 120 may be arranged on, and/or may comprise part of, a headset (not shown in FIG. 1). When headset is installed on a user's head, the user's gaze may be directed towards presentation device 120 (or at least a display of presentation device 120) to view content presented by presentation device 120.

In some implementations, a display may include one or more of a transparent, semi-transparent, reflective, and/or semi-reflective display component or assembly. Images of virtual content may be presented on the display component such that the user may view the images presented on the display component as well as the real-world through the display component. The virtual content may be perceived as being present in the real world. Such a configuration may provide an interactive space comprising an augmented reality environment. By way of non-limiting illustration, presentation device 120 may comprise an AR headset.

In some implementations, the display may comprise a display screen configured to present virtual content. The user may view the display screen such that the display screen may encompass, substantially or entirely, the users field of view without providing views of the real-world through the display screen. Such a configuration may provide an interactive space comprising a virtual reality environment. By way of non-limiting illustration, presentation device 120 may comprise a VR headset.

Individual sensors of presentation device 120 may be configured to generate output signals. An individual sensor may include an orientation sensor and/or other sensors. An orientation sensor of presentation device 120 may be configured to generate output signals conveying orientation information and/or other information. Orientation information derived from output signals of an orientation sensor may define an orientation of presentation device 120. In some implementations, orientation of presentation device 120 may refer to one or more of a pitch angle, a roll angle, a yaw angle, and/or other measurements. An orientation sensor may include an inertial measurement unit (IMU) such as one or more of an accelerometer, a gyroscope, a magnetometer, Inclinometers, and/or other devices.

Individual input devices of one or more input devices 122 may be configured to receive user input. Individual input devices may be configured to receive one or more of physical input, audio input, gesture-based input, and/or other input. By way of non-limiting illustration, one or more input devices 122 may include one or more of a handheld input device, an audio input device, an image capturing device, and/or other devices.

A handheld input device may be configured to receive physical input and/or gesture-based input. A handheld input device may include one or more physical input mechanisms, one or more virtual input mechanisms, and/or other elements. A physical input mechanism may include one or more of a button, a trigger, a joy-stick, and/or other mechanism. A virtual input mechanism may include one or more of a virtual button (e.g., presented on a display screen), a virtual joystick (e.g., presented on a display screen), and/or other mechanisms. In some implementations, a handheld input device may include one or more motion sensors configured to generate output signals conveying gesture-based inputs. In some implementations, a handheld input device may include a controller. A controller may be in the form of one or more of a remote, a weapon, and/or other handheld device.

An image capture device may be configured to obtain and/or determine gesture-based input. An image capture device may be configured to generate output signals conveying image information. Image information may define images of the real-world. A user may perform gestures within a field of view of the image capture device. The gestures may be recognized within images defined by the image information conveyed by the output signals of the image capture device. By way of non-limiting illustration, an image capture device may comprise a camera.

An audio input device may be configured to receive audio input. An audio input device may including a sound transducer or other sensor configured to convert sound (e.g., air pressure variation) into an electrical signal. By way of non-limiting illustration, an audio input device may include a microphone.

Individual haptic feedback devices of one or more haptic feedback devices 124 may be configured to provide haptic output. In some implementations, haptic output by one or more haptic feedback devices 124 may be in response to input. The input causing haptic output may include one or more of particular virtual content present by presentation device 120, particular input provided via individual ones of one or more input devices 122, a combination of virtual content presented by presentation device 120 and input via one or more input devices 122, and/or other input. In some implementations, individual haptic feedback devices may be included in individual input devices and/or may be stand-alone devices. An individual haptic feedback device may comprise one or more of a vibration motor, a heating element, a fan or blower, and/or other device configured to provide haptic output.

The one or more physical processors 104 may be configured by machine-readable instructions 106. Executing machine-readable instructions 106 may cause one or more physical processors 104 to facilitate synchronizing visual effects and haptic feedback for interactive experiences. By way of non-limiting illustration, in the case of gameplay where an input device comprises a weapon, the weapon may include a haptic feedback device. The haptic feedback device may be configured to provide haptic output in response to depression of a button (or trigger) of the weapon to simulate a discharge and/or recoil of the weapon. The haptic output may be provided in response to seemingly simulations display of virtual content on presentation device 120 (e.g., showing the simulation of the discharge and/or recoil).

The machine-readable instructions 106 may include one or more computer program components. The one or more computer program components may include one or more of a visual control component 108, a haptic control component 110, a latency component 112, a synchronization component 114, and/or other components.

The visual control component 108 may be configured to obtain visual circuit control signals and/or other information. The visual circuit control signals may dictate control of presentation device 120 to present images forming virtual content and/or to present other content. The visual circuit control signals may be in the form of data packets, data streams, display control signals, interrupts, inputs/outputs, wireless transmissions, and/or other information.

The visual control component 108 may be configured to effectuate transmission of visual circuit control signals to presentation device 120 and/or other components of system 100. The visual circuit control signals may be configured such that, upon reception by presentation device 120, the visual circuit control signals may be executed by presentation device 120. Execution of visual circuit control signals by presentation device 120 may cause presentation device 120 to present content (e.g., via a display) for viewing by a user.

The haptic control component 110 may be configured to obtain haptic circuit control signals and/or other information. The haptic circuit control signals may dictate control of one or more haptic feedback devices 124 to provide haptic output. In some implementations, one or more input devices 122 and/or other sources may provide a source for haptic circuit control signals. The haptic circuit control signals may be configured such that, upon reception by individual ones of one or more haptic feedback devices 124, the haptic circuit control signals may be executed by one or more haptic feedback devices 124. Execution of haptic circuit control signals by one or more haptic feedback devices 124 may cause one or more haptic feedback devices 124 to provide haptic output. The haptic circuit control signals may be in the form of data packets, data streams, PWM signals, interrupts, inputs/outputs, wireless transmissions, and/or other information.

The latency component 112 may be configured to determine timing information and/or other information. Timing information may convey one or more of latency in the execution of visual circuit control signals by presentation device 120, latency in the execution of haptic circuit control signals by one or more haptic feedback devices 124, and/or relative latency between the execution of haptic circuit control signals by one or more haptic feedback devices 124 and the execution of visual circuit control signals by presentation device 120.

In some implementations, latency in the execution of visual circuit control signals by presentation device 120 may be measured from a point in time when visual circuit control signals are obtained to a point in time when the visual circuit control signals are executed by presentation device 120. By way of non-limiting illustration, latency component 112 may be configured such that determining the timing information comprises determining a value of a visual circuit latency parameter and/or other information. The value of the visual circuit latency parameter may specify a first time delay between a point in time when a transmission of the visual circuit control signals is initiated and a point in time when the visual circuit control signals are executed by presentation device 120.

In some implementations, latency in the execution of haptic circuit control signals by one or more haptic feedback devices 124 may be measured from a point in time when haptic circuit control signals are obtained to a point in time when the haptic circuit control signals are executed by one or more haptic feedback devices 124. By way of non-limiting illustration, latency component 112 may be configured such that determining the timing information may comprise determining a value of a haptic circuit latency parameter and/or other information. The value of the haptic circuit latency parameter may specify a time delay between a point in time when a transmission of the haptic circuit control signals is initiated and a point in time when the haptic circuit control signals are executed by one or more haptic feedback devices 124.

In some implementations, relative latency in both the execution of visual circuit control signals by presentation device 120 and the execution of haptic circuit control signals by one or more haptic feedback devices 124 may refer to a relative time delay. The relative time delay may be related to a time delay between the execution of visual circuit control signals by presentation device 120 and the execution of haptic circuit control signals by one or more haptic feedback devices 124. The relative time delay may specify a time span between an occurrence of an execution of visual circuit control signals by presentation device 120 and an occurrence of an execution of haptic circuit control signals by one or more haptic feedback devices 124, and/or vis versa.

In some implementations, latencies may be attributed to one or more of motion-to-photon latency (e.g., time needed for a user movement to be reflected on a display screen), network timings, component start up times, latencies that might change (e.g., wireless BLE connection interval), and/or other sources. In some implementations, latencies may further be attributed to biological latencies. Biological latencies may include one or more of latency in the time required for light emitted from a display to be processed by the brain, latency in the time required for haptic output to be processed by the nervous system, and/or other latencies.

In some implementations, timing information may be determined based on one or more of an immediate prior transmission of visual circuit control signals to presentation device 120 and/or haptic circuit control signals to one or more haptic feedback devices 124, an aggregate of multiple prior transmissions of visual circuit control signals to presentation device 120 and/or haptic circuit control signals to one or more haptic feedback devices 124. The aggregate may include one or more of a mean, median, mode, standard deviation, running average, and/or other measure determined from multiple measurements of timing information.

In some implementations, multiple prior transmission may be determined based on a predetermined quantity of prior transmissions and/or a quantity of transmissions occurring over a predetermined time span. By way of non-limiting illustration, the multiple prior transmissions may be in the range of ten to twenty prior transmissions, and/or other quantities. By way of non-limiting illustration, the multiple prior transmissions may include a quantity of transmission that occurred within a range of one hundred to nine hundred milliseconds of prior transmissions and/or other time spans.

Figure 2:
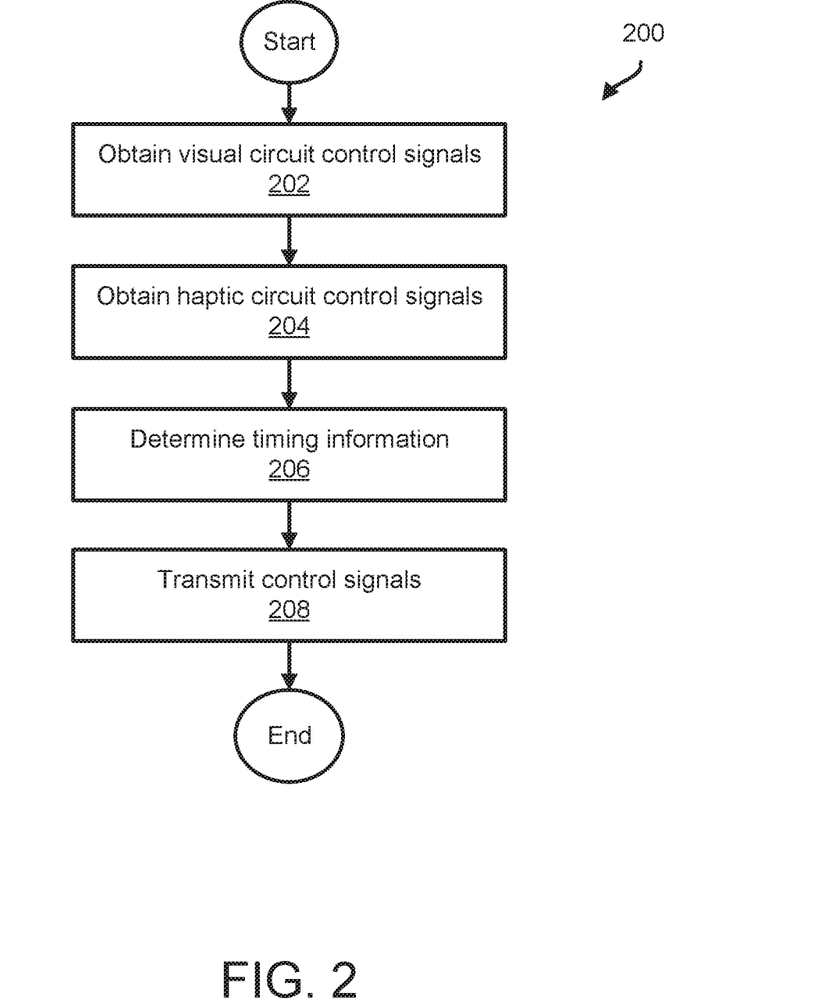
FIG. 2 illustrates a method to synchronize visual effects and haptic feedback for interactive experiences, in accordance with one or more implementations.
Figure 3:
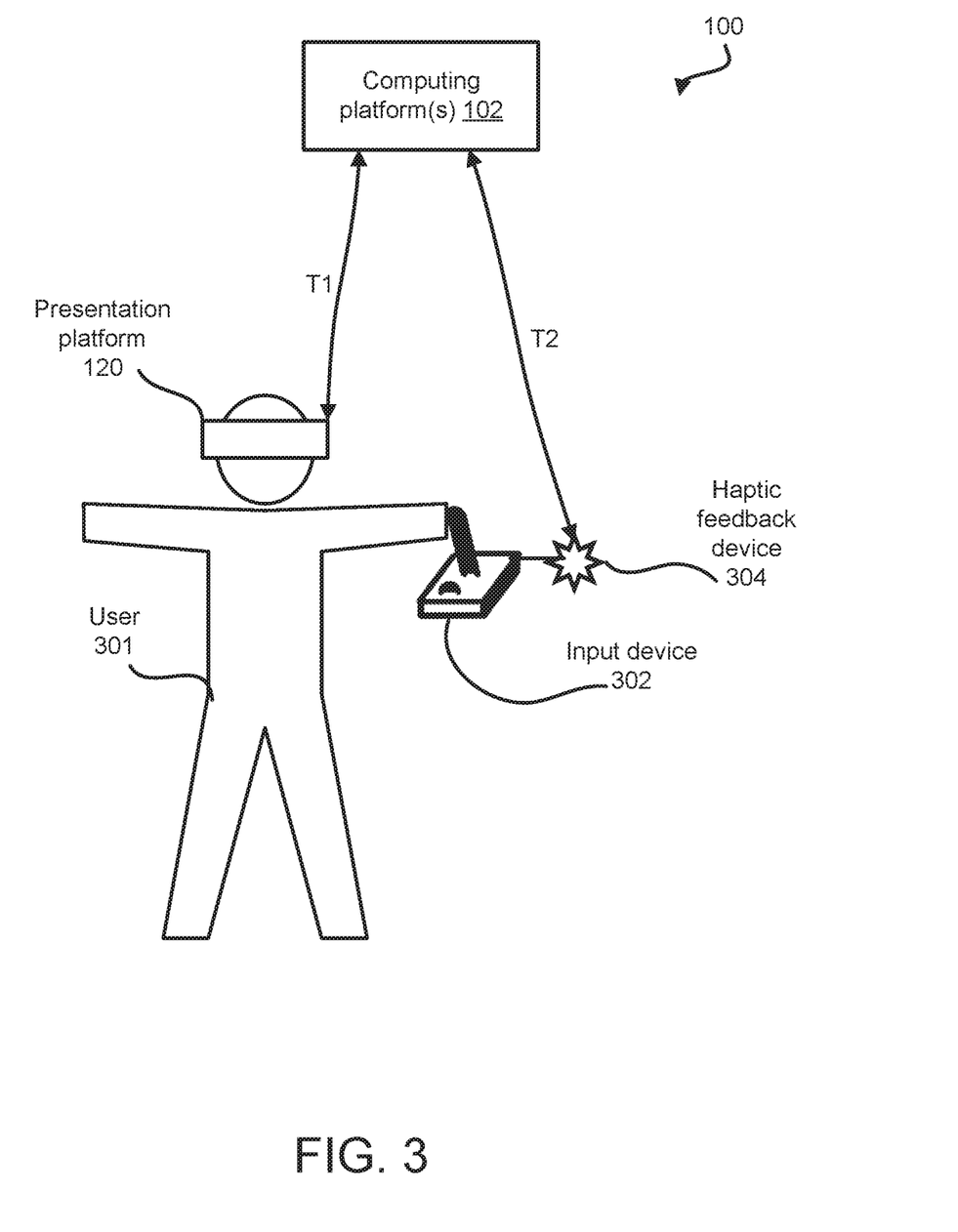
FIG. 3 shows a graphic illustration of an implementation of the system of FIG. 1.

FIG. 2 showing visual graphic of latency in system 100. The system 100 in FIG. 3 may include one or more of one or more computing platforms 102, presentation platform 120, an input device 302, a haptic feedback device 301, and a user. Visual circuit latency may be indicated by time "T1" related to a time delay between initiating transmission of signals from one or more computing platforms 102 and execution of those signals at presentation 120. Haptic circuit latency may be indicated by time "T2" related to a time delay between initiating transmission of signals from one or more computing platforms 102 and execution of those signals at haptic feedback device 304. In some implementation, input device 302 may provide a source for control signals for haptic feedback device 304.

Returning to FIG. 1, synchronization component 114 may be configured to instruct one or both of visual control component 108 and/or haptic control component 110 to effectuate transmission of visual circuit control signals and/or haptic circuit control signals, respectively. In some implementations, synchronization component 114 may instruct one or both of visual control component 108 and/or haptic control component 110 based on timing information and/or other information. In some implementations, the instruction may be to delay transmission of control signals by a certain amount.

In some implementations, the transmission of the visual circuit control signals to presentation device 120 and/or the haptic circuit control signals to one or more haptic feedback devices 124 may be timed (e.g., one or both may be delayed) so that points in time when one or more haptic feedback devices 124 provide haptic output and points in time when presentation device 120 presents images occur within a threshold time span. In some implementations, the threshold time span may be within a range of zero to 100 milliseconds, and/or other ranges. In some implementations, the threshold time span may be within a range of zero to fifty milliseconds, and/or other ranges. In some implementations, the threshold time span may be within a range of zero to twenty five milliseconds, and/or other ranges. In some implementations, the threshold time span may be within a range of zero to ten milliseconds, and/or other ranges. In some implementations, the threshold time span may be within a range of five to fifteen milliseconds, and/or other ranges. In some implementations, the threshold time span may be ten milliseconds.

In some implementations, synchronization component 114 may be configured to compare a prior relative time delay (e.g., an immediate prior and/or aggregate) with the threshold time span. The comparison may include one or more of determining if the prior relative time delay is greater than, equal to, or less than the threshold time span. The comparison may further include determining whether the prior executions of the visual circuit control signals by presentation device 120 occurred relatively sooner, or later, than prior executions of the haptic circuit control signals by one or more haptic feedback devices 124. Based on the comparison, synchronization component 114 may be configured to instruct one or both of visual control component 108 and/or haptic control component 110 to effectuate current transmissions of the visual circuit control signals to presentation device 120 and/or the haptic circuit control signals to one or more haptic feedback devices 124. The instruction may be configured so that a current anticipated relative time delay between a current execution of the visual circuit control signals by presentation device 120 and a current execution of the haptic circuit control signals by one or more haptic feedback devices 124 may be less than or equal to the threshold time span.

By way of non-limiting illustration, based on a comparison indicating a prior relative time delay is greater than a threshold time span and the prior execution(s) of the visual circuit control signals by presentation device 120 occurred relatively sooner than prior executions of the haptic circuit control signals by one or more haptic feedback devices 124, synchronization component 114 may be configured to instruct visual control component 108 to delay the current transmissions of the visual circuit control signals to presentation device 120. The current transmissions of the visual circuit control signals to presentation device 120 may be delayed by a certain amount of time so that a current anticipated relative time delay between a current execution of the visual circuit control signals by presentation device 120 and a current execution of the haptic circuit control signals by one or more haptic feedback devices 124 may be less than or equal to the threshold time span. The certain amount may be determined based on a difference between the prior relative time delay and the threshold time span. For example, the certain amount may be the difference and/or other value.

By way of non-limiting illustration, based on comparison indicating the prior relative time delay is greater than the threshold time span and that the prior executions of the visual circuit control signals by presentation device 120 occurred relatively later than the prior executions of the haptic circuit control signals by the one or more haptic feedback devices 124, synchronization component 114 may be configured to instruct haptic control component 110 to delay the current transmissions of the haptic circuit control signals to one or more haptic feedback devices 124. The current transmissions of the haptic circuit control signals to one or more haptic feedback devices 124 may be delayed by a certain amount so that a current anticipated relative time delay between a current execution of the visual circuit control signals by presentation device 120 and a current execution of the haptic circuit control signals by one or more haptic feedback devices 124 may be less than or equal to the threshold time span. The certain amount may be determined based on a difference between the prior relative time delay and the threshold time span. For example, the certain amount may be the difference and/or other value.

In some implementations, synchronization component 114 may be configured to compare a value of the visual circuit latency parameter with a value of the haptic circuit latency parameter. The synchronization component 114 may be configured to, based on the comparison, instruct one or both of visual control component 108 and/or haptic control component 110 effectuate transmission of the visual circuit control signals to presentation device 120 and/or the haptic circuit control signals to one or more haptic feedback devices 124, respectively. The instruction by synchronization component 114 may be configured so that the points in time when the visual circuit control signals are executed by presentation device 120 and the points in time when the haptic circuit control signals are executed by one or more haptic feedback devices 124 may occur within a threshold time span.

By way of non-limiting illustration, latency component 112 may be configured to determine a value of the visual circuit latency parameter associated with a current transmission of the visual circuit control signals to presentation device 120 and a value of the haptic circuit latency parameter associated with a current transmission of the haptic circuit control signals to one or more haptic feedback devices 124. The value of the visual circuit latency parameter may specify a first time delay between points in time when a transmission of the visual circuit control signals is initiated and points in time when the visual circuit control signals are executed by presentation device 120. The value of the haptic circuit latency parameter may specify a second time delay between points in time when a transmission of the haptic circuit control signals is initiated and points in time when the haptic circuit control signals are executed by one or more haptic feedback devices 124.

For a subsequent transmission of the visual circuit control signals and the haptic circuit control signals: synchronization component 114 may be configured to compare the value of the visual circuit latency parameter with the value of the haptic circuit latency parameter. The comparisons may include determining whether the first time delay is greater than, less than, or equal to the second time delay.

In some implementations, based on the comparison indicating that the first time delay in the current transmission is greater than the second time delay (e.g., the visual effects take longer), synchronization component 114 may be configured to instruct haptic control component 110 to delay the subsequent transmission of the haptic circuit control signals to one or more haptic feedback devices 124 by a first amount of time. The first amount of time may be determined so that the second time delay may be substantially the same as the first time delay. In some implementations, synchronization component 114 may be configured to determine the first amount of time based on a difference between the value of the visual circuit latency parameter for the current transmission and the value of the haptic circuit latency parameter associated for the current transmission. For example, the first amount of time may be the difference and/or other value so that the executions of the control signals occur within the threshold time span. Thus, the time delay associated with the control signals being transmitted to and executed by presentation device 120 and the time delay associated with control signals being transmitted to and executed by one or more haptic feedback devices 124 may be the same, or similar, time delay. This may cause the subsequent executions to occur simultaneously (or at least within the threshold time span).

In some implementations, based on the comparison indicating that the second time delay in the current transmission is greater than the first time delay (e.g., the haptic effects take longer), synchronization component 114 may be configured to instruct visual control component 108 to delay the subsequent transmission of the visual circuit control signals to presentation device 120 by a second amount of time. The second amount of time may be determined so that the first time delay may be substantially the same as the second time delay. In some implementations, synchronization component 114 may be configured to determine the second amount of time based on a difference between the value of the haptic circuit parameter for the current transmission and the value of the latency visual circuit latency parameter associated for the current transmission. For example, the second amount of time may be the difference and/or other value so that the executions of the control signals occur within the threshold time span. Thus, the time delay associated with the control signals being transmitted to and executed by presentation device 120 and time delay associated with the control signals being transmitted to and executed by one or more haptic feedback devices 124 may be the same, or similar, time delay. This may cause the subsequent executions to occur simultaneously (or at least within the threshold time span).

It is noted that the features and/or functions of one or more components of machine-readable instructions 106 (e.g., components 108, 110, 112, and/or 114) may be performed continuously until the executions of the control signals are maintained within the threshold time span. The system 100 may continue to monitor the executions of the control signals. When the relative time delay is at or within the threshold time span, the delays currently set for one or more transmissions may be kept at the same setting. When the relative time delay becomes greater than the threshold time span, delays may be effectuated as described herein.

In some implementations, a user may be provided an a graphical (or physical) interface (not shown in the figures) to tune the synchronization. Tuning may include setting and/or adjusting the relative time delay and/or other aspect of the communication of control signals. This may allow users to customize system 100 based on reaction times specific to themselves. In some implementations, tuning may include calibrating the synchronization specifically to individual users when system 100 is initiated. The calibration may be facilitated by an interface that may allow the user to provide feedback to set or adjust the relative time delay to their liking. For example, during calibration, visual output and haptic output may be provided based on a currently set relative time delay. The user may provide feedback to increase and/or decrease such time delay.

Returning to FIG. 1, external resources 126 may include sources of information, hosts, and/or providers of information outside of system 100, external entities participating with system 100, and/or other resources. In some implementations, some or all of the functionality attributed herein to external resources 126 may be provided by resources included in system 100.

Computing platform(s) 102 may include communication lines or ports to enable the exchange of information with a network. Illustration of computing platform(s) 102 in FIG. 1 is not intended to be limiting. Computing platform(s) 102 may include a plurality of hardware, software, and/or firmware components operating together to provide the functionality attributed herein to computing platform(s) 102. For example, computing platform(s) 102 may be implemented by a cloud of computing platforms operating together as computing platform(s) 102.

Electronic storage 116 may include electronic storage media that electronically stores information. The electronic storage media of electronic storage 116 may include one or both of system storage that is provided integrally (i.e., substantially non-removable) with computing platform(s) 102 and/or removable storage that is removably connectable to computing platform(s) 102 via, for example, a port or a drive. A port may include a USB port, a firewire port, and/or other port. A drive may include a disk drive and/or other drive. Electronic storage 116 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 116 may include one or more virtual storage resources (e.g., cloud storage, a virtual private network, and/or other virtual storage resources). Electronic storage 116 may store software algorithms, information determined by processor(s) 104, information received from computing platform(s) 122, and/or other information that enables system 100 to function as described herein.

Processor(s) 104 may be configured to provide information-processing capabilities in computing platform(s) 102. As such, processor(s) 104 may include one or more of a digital processor, an analog processor, a digital circuit designed to process information, an analog circuit designed to process information, a state machine, and/or other mechanisms for electronically processing information. Although processor(s) 104 is shown in FIG. 1 as a single entity, this is for illustrative purposes only. In some implementations, processor(s) 104 may include one or more processing units. These processing units may be physically located within the same device, or processor(s) 104 may represent processing functionality of a plurality of devices operating in coordination. The processor(s) 104 may be configured to execute components 108-114. Processor(s) 104 may be configured to execute components 108-114 by software; hardware; firmware; some combination of software, hardware, and/or firmware; and/or other mechanisms for configuring processing capabilities on processor(s) 104.

It should be appreciated that although components 108-114 are illustrated in FIG. 1 as being co-located within a single processing unit, in implementations in which processor(s) 104 includes multiple processing units, one or more of components 108-114 may be located remotely from the other components. While computer program components are described herein as being implemented via processor(s) 104 through machine readable instructions 106, this is merely for ease of reference and is not meant to be limiting. In some implementations, one or more functions of computer program components described herein may be implemented via hardware (e.g., dedicated chip, field-programmable gate array). One or more functions of computer program components described herein may be one or more of software-implemented, hardware-implemented, and/or software and hardware-implemented. The description of the functionality provided by the different components 108-114 described above is for illustrative purposes and is not intended to be limiting, as any of components 108-114 may provide more or less functionality than is described. For example, one or more of components 108-114 may be eliminated, and some or all of its functionality may be provided by other ones of components 108-114 and/or other components. As another example, processor(s) 104 may be configured to execute one or more additional components that may perform some or all of the functionality attributed to one of components 108-114.

FIG. 2 illustrates a method 200 to synchronize visual effects and haptic feedback for interactive experiences, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in a computer system comprising one or more processing devices (e.g., a digital processor, an analog processor, a digital circuit designed to process information, an analog circuit designed to process information, a state machine, and/or other mechanisms for electronically processing information), storage media storing machine-readable instructions, and/or other components. The one or more processing devices may include one or more devices executing some or all of the operations of method 200 in response to instructions stored electronically on electronic storage media. The one or more processing devices may include one or more devices configured through hardware, firmware, and/or software to be specifically designed for execution of one or more of the operations of method 200.

At an operation 202, visual circuit control signals may be obtained. The visual circuit control signals may dictate control of a presentation device to present images forming virtual content. The presentation device may be arranged on a headset such that when the headset is installed on a user's head, the user's gaze may be directed towards the presentation device to view the images. The execution of the visual circuit control signals by the presentation device may cause the presentation device to present the images at a first point in time. In some implementations, operation 202 may be performed by one or more physical processors executing a visual control component the same as or similar to visual control component 108 (shown in FIG. 1 and described herein).

At an operation 204, haptic circuit control signals may be obtained. The haptic circuit control signals may dictate control of a haptic feedback device to provide haptic output. The execution of the haptic circuit control signals by the haptic feedback device may cause the haptic feedback device to provide the haptic output at a second point in time. In some implementations, operation 204 may be performed by one or more physical processors executing a haptic control component the same as or similar to haptic control component 110 (shown in FIG. 1 and described herein).

At an operation 206, timing information may be determined. The timing information may conveying one or both of latency in the execution of the visual circuit control signals by the presentation device and/or latency in the execution of the haptic circuit control signals by the haptic feedback device. In some implementations, operation 206 may be performed by one or more physical processors executing a latency component the same as or similar to latency component 112 (shown in FIG. 1 and described herein).

At an operation 208, based on the timing information, transmission of the visual circuit control signals to the presentation device and/or the haptic circuit control signals to the haptic feedback device may be effectuated. The transmission(s) may be configured so that the first point in time and the second point in time may occur within a threshold time span. In some implementations, operation 208 may be performed by one or more physical processors executing an synchronization component the same as or similar to synchronization component 114 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to synchronize visual effects and haptic feedback for an interactive experience, the system comprising:
   one or more physical processors configured by machine-readable instructions to:
      obtain visual circuit control signals, the visual circuit control signals dictating control of a presentation device to present images forming virtual content, wherein the presentation device is arranged on a headset such that when the headset is installed on a user's head, the user's gaze is directed towards the presentation device to view the images, wherein execution of the visual circuit control signals by the presentation device causes the presentation device to present the images at a first point in time;
      obtain haptic circuit control signals, the haptic circuit control signals dictating control of a haptic feedback device to provide haptic output, wherein execution of the haptic circuit control signals by the haptic feedback device causes the haptic feedback device to provide the haptic output at a second point in time;
      determine timing information conveying one or both of latency in the execution of the visual circuit control signals by the presentation device and/or latency in the execution of the haptic circuit control signals by the haptic feedback device;
      based on the timing information, effectuate transmission of the visual circuit control signals to the presentation device and the haptic circuit control signals to the haptic feedback device so that the first point in time and the second point in time occur within a threshold time span;
      wherein determining the timing information comprises:
         determining a prior relative time delay between prior executions of the visual circuit control signals by the presentation device and prior executions of the haptic circuit control signals by the haptic feedback device;
      based on the prior relative time delay, effectuate current transmissions of the visual circuit control signals to the presentation device and the haptic circuit control signals to the haptic feedback device so that a current relative time delay between a current execution of the visual circuit control signals by the presentation device and a current execution of the haptic circuit control signals by the haptic feedback device is less than or equal to the threshold time span;
      based on the prior relative time delay being greater than the threshold time span and indicating the prior executions of the visual circuit control signals by the presentation device occur relatively sooner than the prior executions of the haptic circuit control signals by the haptic feedback device,
         delay the transmission of the current transmissions of the visual circuit control signals to the presentation device so that the current relative time delay between the current execution of the visual circuit control signals by the presentation device and the current execution of the haptic circuit control signals by the haptic feedback device is less than or equal to the threshold time span; and
      based on the prior relative time delay being greater than the threshold time span and indicating the prior executions of the visual circuit control signals by the presentation device occur relatively later than the prior executions of the haptic circuit control signals by the haptic feedback device, delay the transmission of the current transmissions of the haptic circuit control signals to the haptic feedback device so that the current relative time delay between the current execution of the visual circuit control signals by the presentation device and the current execution of the haptic circuit control signals by the haptic feedback device is less than or equal to the threshold time span.

2. The system of claim 1, wherein the prior relative time delay is an immediately prior relative time delay.

3. The system of claim 2, wherein the prior relative time delay is an aggregate prior time delay.

4. The system of claim 1, wherein the presentation device is arranged on the headset such that when the headset is installed on the user's head, the user's gaze is directed towards the presentation device to view the images and the real world to create an augmented reality environment.

5. A system configured to synchronize visual effects and haptic feedback for an interactive experience, the system comprising:

one or more physical processors configured by machine-readable instructions to:

obtain visual circuit control signals, the visual circuit control signals dictating control of a presentation device to present images forming virtual content, wherein the presentation device is arranged on a headset such that when the headset is installed on a user's head, the user's gaze is directed towards the presentation device to view the images, wherein execution of the visual circuit control signals by the presentation device causes the presentation device to present the images at a first point in time;

obtain haptic circuit control signals, the haptic circuit control signals dictating control of a haptic feedback device to provide haptic output, wherein execution of the haptic circuit control signals by the haptic feedback device causes the haptic feedback device to provide the haptic output at a second point in time;

determine timing information conveying one or both of latency in the execution of the visual circuit control signals by the presentation device and/or latency in the execution of the haptic circuit control signals by the haptic feedback device;

based on the timing information, effectuate transmission of the visual circuit control signals to the presentation device and the haptic circuit control signals to the haptic feedback device so that the first point in time and the second point in time occur within a threshold time span;

wherein determining the timing information comprises:

determining a value of a visual circuit latency parameter, the value of the visual circuit latency parameter specifying a first time delay between points in time when a transmission of the visual circuit control signals is initiated and points in time when the visual circuit control signals are executed by the presentation device; and determining a value of a haptic circuit latency parameter, the value of the haptic circuit latency parameter specifying a second time delay between points in time when a transmission of the haptic circuit control signals is initiated and points in time when the haptic circuit control signals are executed by the haptic feedback device;

compare the value of the visual circuit latency parameter with the value of the haptic circuit latency parameter;

based on the comparison, effectuate transmission of the visual circuit control signals to the presentation device and the haptic circuit control signals to the haptic feedback device so that the points in time when the visual circuit control signals are executed by the presentation device and the points in time when the haptic circuit control signals are executed by the haptic feedback device occur within the threshold time span;

determine the value of the visual circuit latency parameter and the value of the haptic circuit latency parameter associated with a current transmission of the visual circuit control signals to the presentation device and the haptic circuit control signals to the haptic feedback device; and for a subsequent transmission of the visual circuit control signals to the presentation device and the haptic circuit control signals to the haptic feedback device:

based on the comparison indicating that the first time delay in the current transmission is greater than the second time delay, delay the subsequent transmission of the haptic circuit control signals to the haptic feedback device a first amount of time so that the second time delay is substantially the same as the first time delay; and based on the comparison indicating that the second time delay in the current transmission is greater than the first time delay, delay the subsequent transmissions of the visual circuit control signals to the presentation device a second amount of time so that the first time delay is substantially the same as the second time delay.

6. The system of claim 5, wherein the one or more physical processors are further configured by the machine-readable instructions to:

determine the first amount of time based on a difference between the value of the visual circuit latency parameter for the current transmission and the value of the haptic circuit latency parameter associated for the current transmission; and determine the second amount of time based on a difference between the value of the haptic circuit parameter for the current transmission and the value of the latency visual circuit latency parameter associated for the current transmission.

7. A method to synchronize visual effects and haptic feedback for an interactive experience, the method comprising:

obtaining visual circuit control signals, the visual circuit control signals dictating control of a presentation device to present images forming virtual content, wherein the presentation device is arranged on a headset such that when the headset is installed on a user's head, the user's gaze is directed towards the presentation device to view the images, wherein execution of the visual circuit control signals by the presentation device causes the presentation device to present the images at a first point in time;

obtaining haptic circuit control signals, the haptic circuit control signals dictating control of a haptic feedback device to provide haptic output, wherein execution of the haptic circuit control signals by the haptic feedback device causes the haptic feedback device to provide the haptic output at a second point in time;

determining timing information conveying one or both of latency in the execution of the visual circuit control signals by the presentation device and/or latency in the execution of the haptic circuit control signals by the haptic feedback device;

based on the timing information, effectuating transmission of the visual circuit control signals to the presentation device and the haptic circuit control signals to the haptic feedback device so that the first point in time and the second point in time occur within a threshold time span;

wherein determining the timing information comprises:
   determining a prior relative time delay between prior executions of the visual circuit control signals by the presentation device and prior executions of the haptic circuit control signals by the haptic feedback device;

based on the prior relative time delay, effectuating current transmissions of the visual circuit control signals to the presentation device and the haptic circuit control signals to the haptic feedback device so that a current relative time delay between a current execution of the visual circuit control signals by the presentation device and a current execution of the haptic circuit control signals by the haptic feedback device is less than or equal to the threshold time span;

based on the prior relative time delay being greater than the threshold time span and indicating the prior executions of the visual circuit control signals by the presentation device occur relatively sooner than the prior executions of the haptic circuit control signals by the haptic feedback device,
   delaying the transmission of the current transmissions of the visual circuit control signals to the presentation device so that the current relative time delay between the current execution of the visual circuit control signals by the presentation device and the current execution of the haptic circuit control signals by the haptic feedback device is less than or equal to the threshold time span; and based on the prior relative time delay being greater than the threshold time span and indicating the prior executions of the visual circuit control signals by the presentation device occur relatively later than the prior executions of the haptic circuit control signals by the haptic feedback device,
   delaying the transmission of the current transmissions of the haptic circuit control signals to the haptic feedback device so that the current relative time delay between the current execution of the visual circuit control signals by the presentation device and the current execution of the haptic circuit control signals by the haptic feedback device is less than or equal to the threshold time span.

8. The method of claim 7, wherein the prior relative time delay is an immediately prior relative time delay.

9. The method of claim 8, wherein the prior relative time delay is an aggregate prior time delay.

10. The method of claim 7, wherein the presentation device is arranged on the headset such that when the headset is installed on the user's head, the user's gaze is directed towards the presentation device to view the images and the real world to create an augmented reality environment.

11. A method to synchronize visual effects and haptic feedback for an interactive experience, the method comprising:

obtaining visual circuit control signals, the visual circuit control signals dictating control of a presentation device to present images forming virtual content, wherein the presentation device is arranged on a headset such that when the headset is installed on a user's head, the user's gaze is directed towards the presentation device to view the images, wherein execution of the visual circuit control signals by the presentation device causes the presentation device to present the images at a first point in time;

obtaining haptic circuit control signals, the haptic circuit control signals dictating control of a haptic feedback device to provide haptic output, wherein execution of the haptic circuit control signals by the haptic feedback device causes the haptic feedback device to provide the haptic output at a second point in time;

determining timing information conveying one or both of latency in the execution of the visual circuit control signals by the presentation device and/or latency in the execution of the haptic circuit control signals by the haptic feedback device;

based on the timing information, effectuating transmission of the visual circuit control signals to the presentation device and the haptic circuit control signals to the haptic feedback device so that the first point in time and the second point in time occur within a threshold time span;

determining the timing information comprises:
   determining a value of a visual circuit latency parameter, the value of the visual circuit latency parameter specifying a first time delay between points in time when a transmission of the visual circuit control signals is initiated and points in time when the visual circuit control signals are executed by the presentation device; and
   determining a value of a haptic circuit latency parameter, the value of the haptic circuit latency parameter specifying a second time delay between points in time when a transmission of the haptic circuit control signals is initiated and points in time when the haptic circuit control signals are executed by the haptic feedback device; and comparing the value of the visual circuit latency parameter with the value of the haptic circuit latency parameter;

based on the comparison, effectuating transmission of the visual circuit control signals to the presentation device and the haptic circuit control signals to the haptic feedback device so that the points in time when the visual circuit control signals are executed by the presentation device and the points in time when the haptic circuit control signals are executed by the haptic feedback device occur within the threshold time span;

determining the value of the visual circuit latency parameter and the value of the haptic circuit latency parameter associated with a current transmission of the visual circuit control signals to the presentation device and the haptic circuit control signals to the haptic feedback device; and for a subsequent transmission of the visual circuit control signals to the presentation device and the haptic circuit control signals to the haptic feedback device:
   based on the comparison indicating that the first time delay in the current transmission is greater than the second time delay, delaying the subsequent transmission of the haptic circuit control signals to the haptic feedback device a first amount of time so that the second time delay is substantially the same as the first time delay; and based on the comparison indicating that the second time delay in the current transmission is greater than the first time delay, delaying the subsequent transmissions of the visual circuit control signals to the presentation device a second amount of time so that the first time delay is substantially the same as the second time delay.

12. The method of claim 11, further comprising:

determining the first amount of time based on a difference between the value of the visual circuit latency parameter for the current transmission and the value of the haptic circuit latency parameter associated for the current transmission; and determining the second amount of time based on a difference between the value of the haptic circuit parameter for the current transmission and the value of the latency visual circuit latency parameter associated for the current transmission.

* * * * *